(12) United States Patent
Mehta et al.

(10) Patent No.: US 8,949,887 B2
(45) Date of Patent: Feb. 3, 2015

(54) APPARATUS AND METHOD FOR DISTRIBUTING MEDIA CONTENT

(75) Inventors: Neerav Mehta, Middletown, NJ (US); Paritosh Bajpay, Edison, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1652 days.

(21) Appl. No.: 12/331,459

(22) Filed: Dec. 10, 2008

(65) Prior Publication Data

US 2010/0146567 A1 Jun. 10, 2010

(51) Int. Cl.
*H04N 7/10* (2006.01)
*H04N 21/6408* (2011.01)
*H04N 7/173* (2011.01)
*H04N 21/472* (2011.01)
*H04N 21/61* (2011.01)
*H04N 21/6405* (2011.01)

(52) U.S. Cl.
CPC ....... *H04N 21/6408* (2013.01); *H04N 7/17318* (2013.01); *H04N 21/47202* (2013.01); *H04N 21/6125* (2013.01); *H04N 21/6405* (2013.01)
USPC .......................................... 725/34

(58) Field of Classification Search
CPC ............ H04N 21/812; H04N 7/17318; H04N 21/44222; H04N 21/25891
USPC ........................ 386/125; 709/240; 725/95, 98
See application file for complete search history.

(56) References Cited

U.S. PATENT DOCUMENTS

| | | | |
|---|---|---|---|
| 7,028,329 B1 * | 4/2006 | Mizutani | 725/109 |
| 7,770,200 B2 * | 8/2010 | Brooks et al. | 725/95 |
| 2005/0120369 A1 * | 6/2005 | Matz | 725/40 |
| 2005/0166258 A1 * | 7/2005 | Vasilevsky et al. | 725/138 |
| 2006/0127059 A1 * | 6/2006 | Fanning | 386/125 |
| 2006/0285607 A1 * | 12/2006 | Strodtbeck et al. | 375/298 |
| 2007/0122108 A1 | 5/2007 | Bontempi | |
| 2007/0288964 A1 | 12/2007 | Horiguchi | |
| 2008/0219256 A1 | 9/2008 | Tanaka | |
| 2009/0063703 A1 * | 3/2009 | Finkelstein et al. | 709/240 |
| 2010/0132007 A1 * | 5/2010 | Rodriguez et al. | 725/135 |

* cited by examiner

*Primary Examiner* — Benjamin R Bruckart
*Assistant Examiner* — Anthony Bantamoi
(74) *Attorney, Agent, or Firm* — Guntin & Gust, PLC; Joseph Hrutka

(57) ABSTRACT

A system that incorporates teachings of the present disclosure may include, for example, a server having a controller to access multiple media content in response to a request to record the multiple media content from a first communication device, adjust a format of at least a portion of the multiple media content based at least in part on a user profile associated with the first communication device, and compile the adjusted multiple media content for delivery. Other embodiments are disclosed.

25 Claims, 10 Drawing Sheets

500

APPARATUS AND METHOD FOR DISTRIBUTING MEDIA CONTENT

FIELD OF THE DISCLOSURE

The present disclosure relates generally to communication systems and more specifically to an apparatus and method for distributing media content.

BACKGROUND

Service providers often have various sources at their disposal for obtaining media content, including their own storage, an originating source, and third party providers. Users often desire to access related media content, which may or may not be directly accessible from the service provider. Users often have multiple devices for presenting the media content, which can include fixed devices and mobile devices. These devices can have a wide variety of adjustable features for improving the viewing experience of the users.

DETAILED DESCRIPTION

One embodiment of the present disclosure can entail a computer-readable storage medium. The storage medium can include computer instructions for receiving from a first communication device a request for recording multiple media content, accessing each of the multiple media content, accessing a user profile associated with the first communication device, adjusting a format of at least a portion of the multiple media content based at least in part on the user profile, and concatenating the adjusted multiple media content for delivery.

Another embodiment of the present disclosure can entail a server having a controller to access multiple media content in response to a request to record the multiple media content from a first communication device, adjust a format of at least a portion of the multiple media content based at least in part on a user profile associated with the first communication device, and compile the adjusted multiple media content for delivery.

Yet another embodiment of the present disclosure can entail a set top box having a controller to transmit to a server a request for recording multiple media content, transmit to the server a playback request associated with the multiple media content, receive a compilation of the multiple media content where the received compilation of the multiple media content has a format adjusted based on a user profile associated with the set top box, and present the compilation of the multiple media content on a display device.

Yet another embodiment of the present disclosure can entail a mobile communication device having a controller to transmit to a server a request for recording media content, and transmit to the server a playback request associated with the media content. The playback request can be for presentation of the media content on a display device of a set top box, where the media content can have a format adjusted by the server based on a user profile associated with the mobile communication device and the set top box.

Yet another embodiment of the present disclosure can entail a method including accessing multiple media content in response to a request to record the multiple media content from a user of a first communication device, adjusting a format of at least a portion of the multiple media content based at least in part on user preferences associated with the first communication device and a second communication device associated with the user, and compiling the adjusted multiple media content for delivery.

Figure 1:
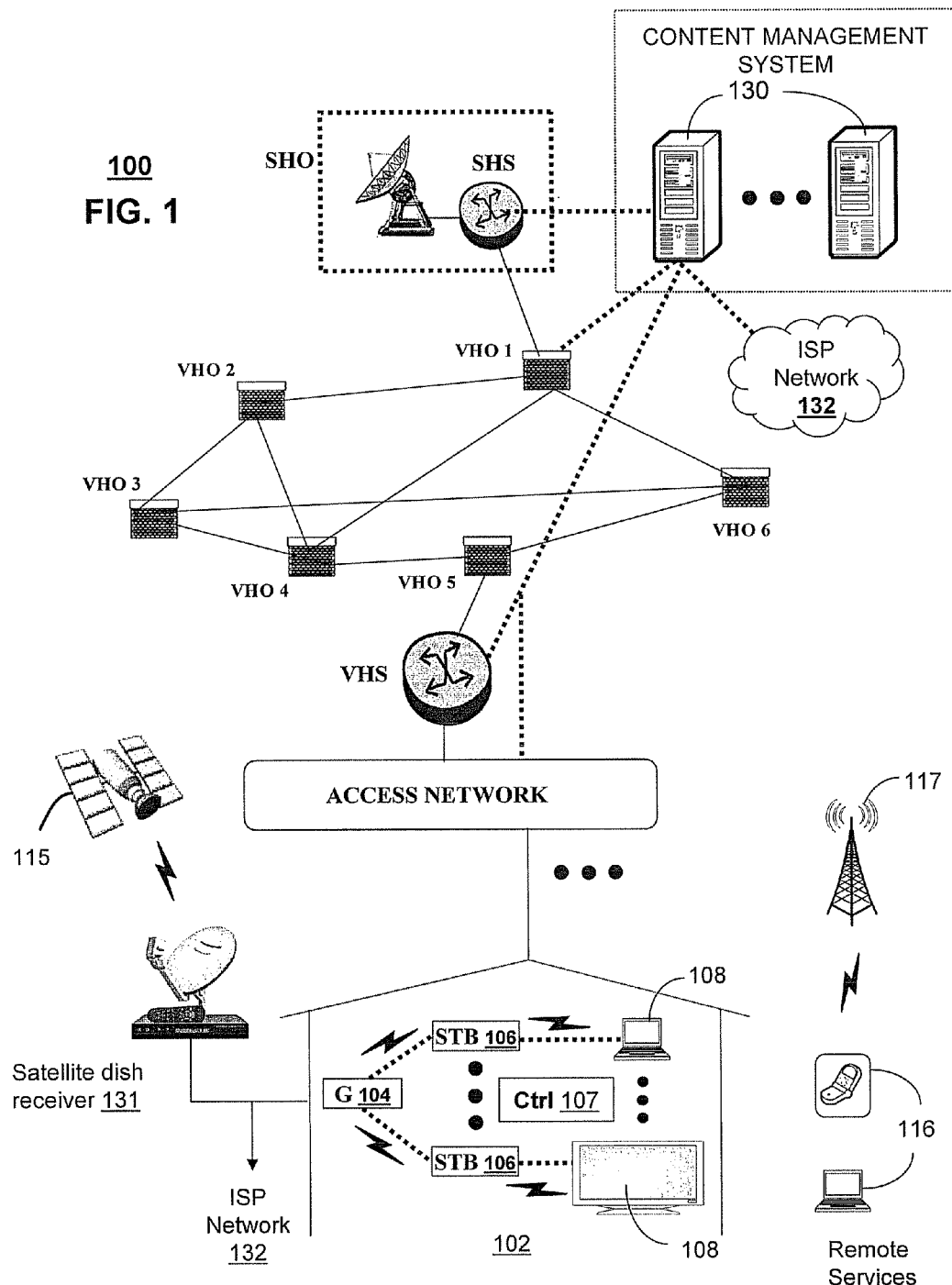
FIGS. 1-3 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.). In one embodiment, the computing devices 130 can be part of or can constitute a mobile device content management system. The system 130 can provide for recording of media content by the mobile device and/or delivery of the recorded content to the mobile device. The system 130 can adjust a format of the content prior to delivery to the mobile device to facilitate presentation of the content by the mobile device. For instance, the system 130 can consult user information, including user profiles, monitored behavior and/or inputted user preferences, and can adjust the format of the content based on the user information, including transcoding or re-formatting the data. In one embodiment, the system 130 can select a video profile of the media content from a plurality of video profiles included in an Enhanced Vestigial Sideband Modulation (E-VSB) data stream.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
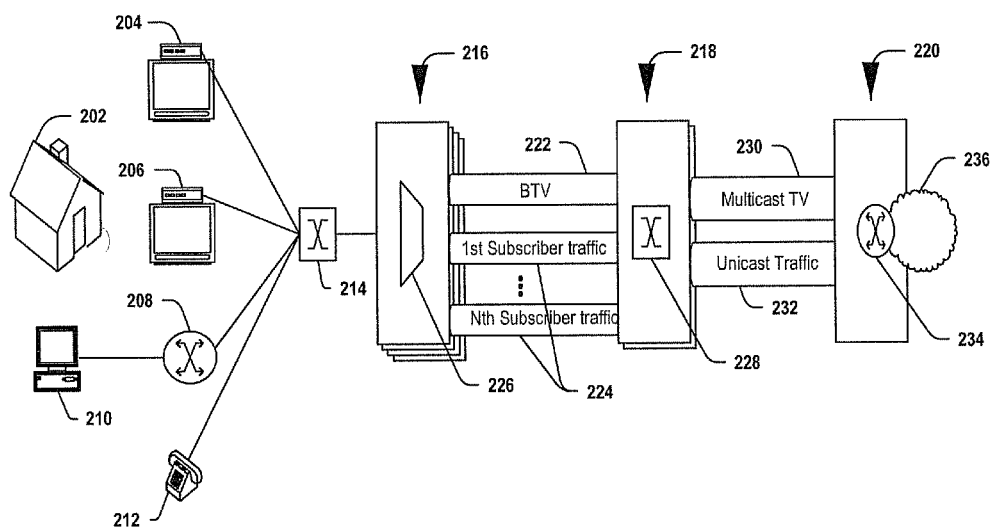

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
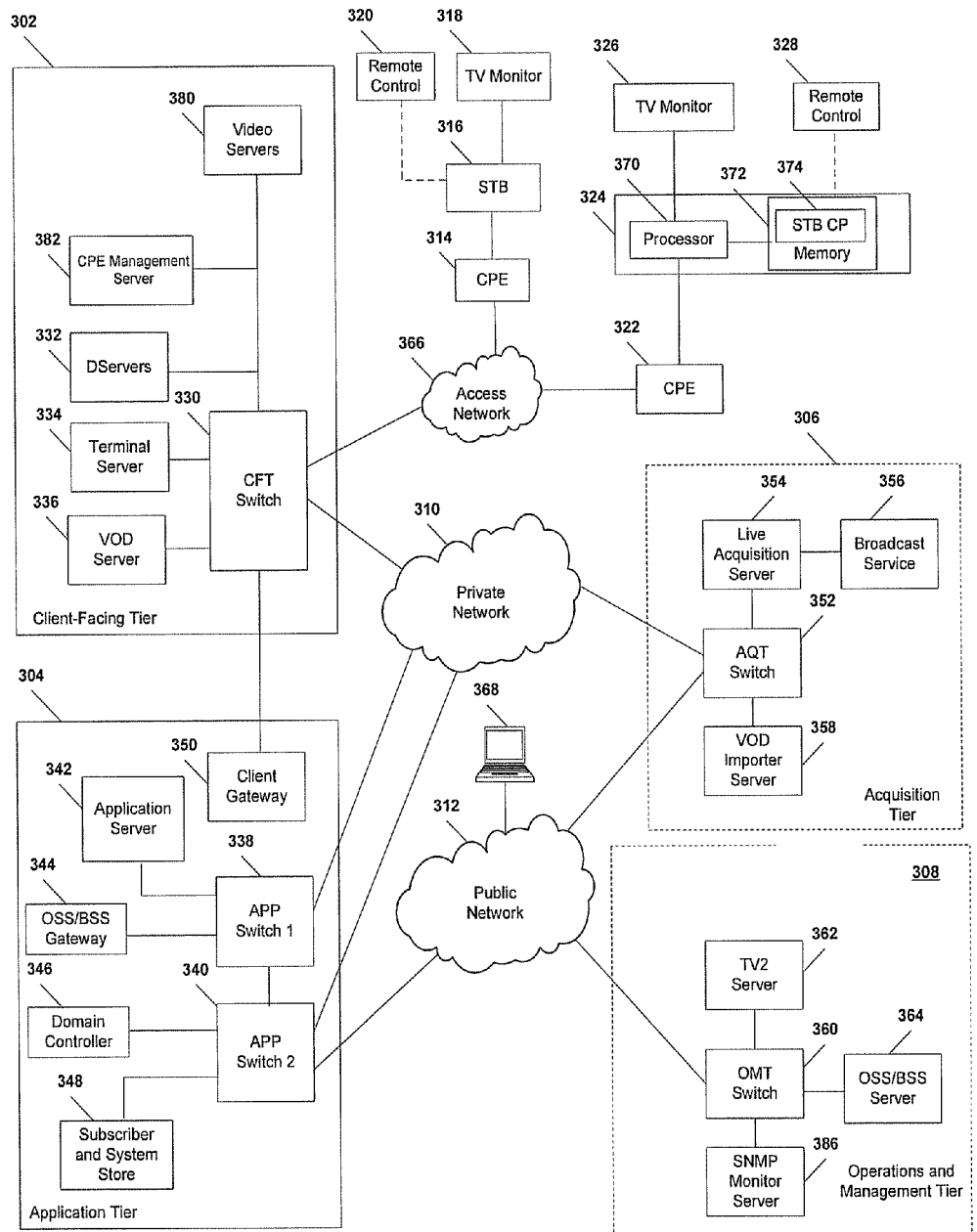

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
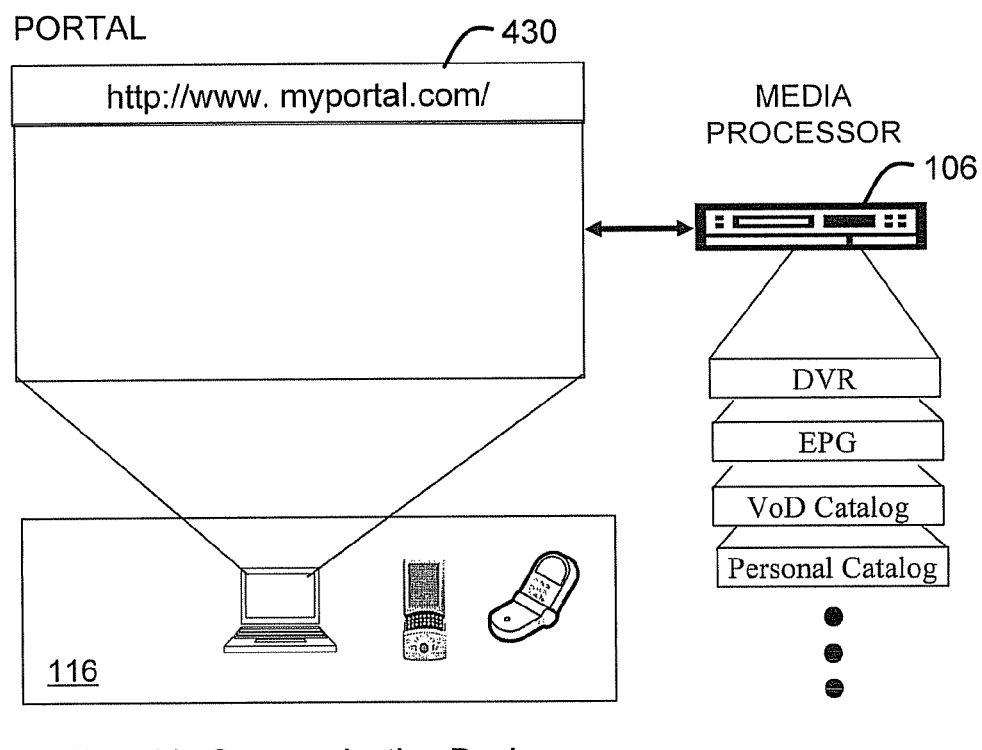
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 5:
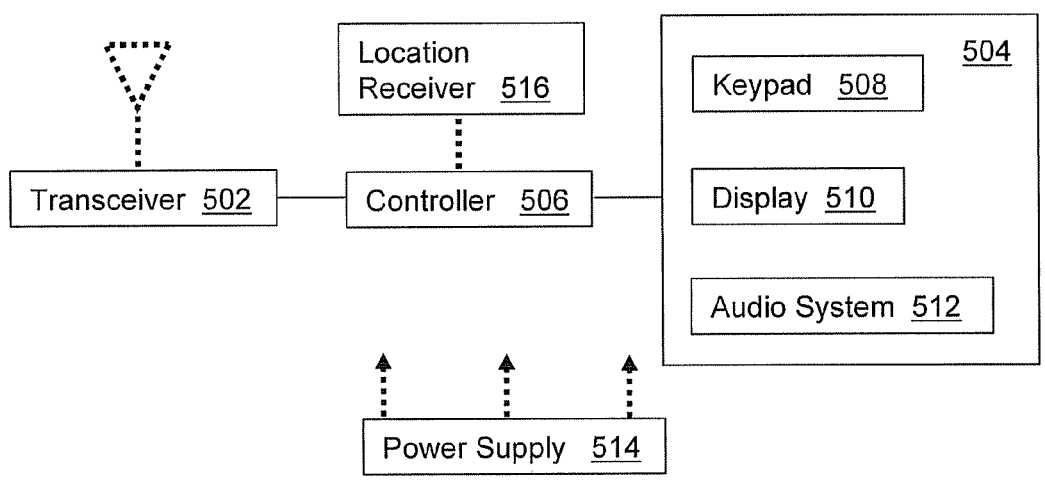
FIG. 5 depicts an illustrative embodiment of a communication device utilized in the communication systems of FIGS. 1-3.

FIG. 5 depicts an exemplary embodiment of a communication device 500. Communication device 500 can be a representative portion of any of the aforementioned communication devices of FIGS. 1-3. The communication device 504 can comprise a wireline and/or wireless transceiver 502 (herein transceiver 502), a user interface (UI) 504, a power supply 514, a location receiver 516, and a controller 506 for managing operations thereof. The transceiver 502 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 502 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 502 can also be adapted to support IP Multimedia Subsystem (IMS) protocol for interfacing to an IMS network that can combine PSTN and VoIP communication technologies.

The UI 504 can include a depressible or touch-sensitive keypad 508 and a navigation mechanism such as a roller ball, joystick, mouse, and/or navigation disk for manipulating operations of the communication device 500. The keypad 508 can be an integral part of a housing assembly of the communication device 500 or an independent device operably coupled thereto by a tethered wiring interface (such as a USB) or a wireless interface supporting for example Bluetooth. The keypad 508 can represent a numeric dialing keypad commonly used by phones, and/or a Qwerty keypad with alphanumeric keys.

The UI 504 can further include a display 510 such as monochrome or color LCD (Liquid Crystal Display), OLED (Organic Light Emitting Diode) or other suitable display technology for conveying images to the end user of the communication device 500. In an embodiment where the display 510 is touch-sensitive, a portion or all of the keypad 508 can be presented by way of the display. The UI 504 can also include an audio system 512 that utilizes common audio technology for conveying low volume audio (such as audio heard only in the proximity of a human ear) and high volume audio (such as speakerphone for hands free operation). The audio system 512 can further include a microphone for receiving audible signals of an end user.

The power supply 514 can utilize common power management technologies such as replaceable and rechargeable batteries, supply regulation technologies, and charging system technologies for supplying energy to the components of the communication device 500 to facilitate long-range or short-range portable applications. In one embodiment, the device 500 can be a battery-operated mobile multi-mode device. The location receiver 516 utilize common location technology such as a global positioning system (GPS) receiver for identifying a location of the communication device 100, thereby facilitating common location services such as navigation. The controller 506 can utilize computing technologies such as a microprocessor and/or digital signal processor (DSP) with associated storage memory such a Flash, ROM, RAM, SRAM, DRAM or other storage technologies.

Figure 6:
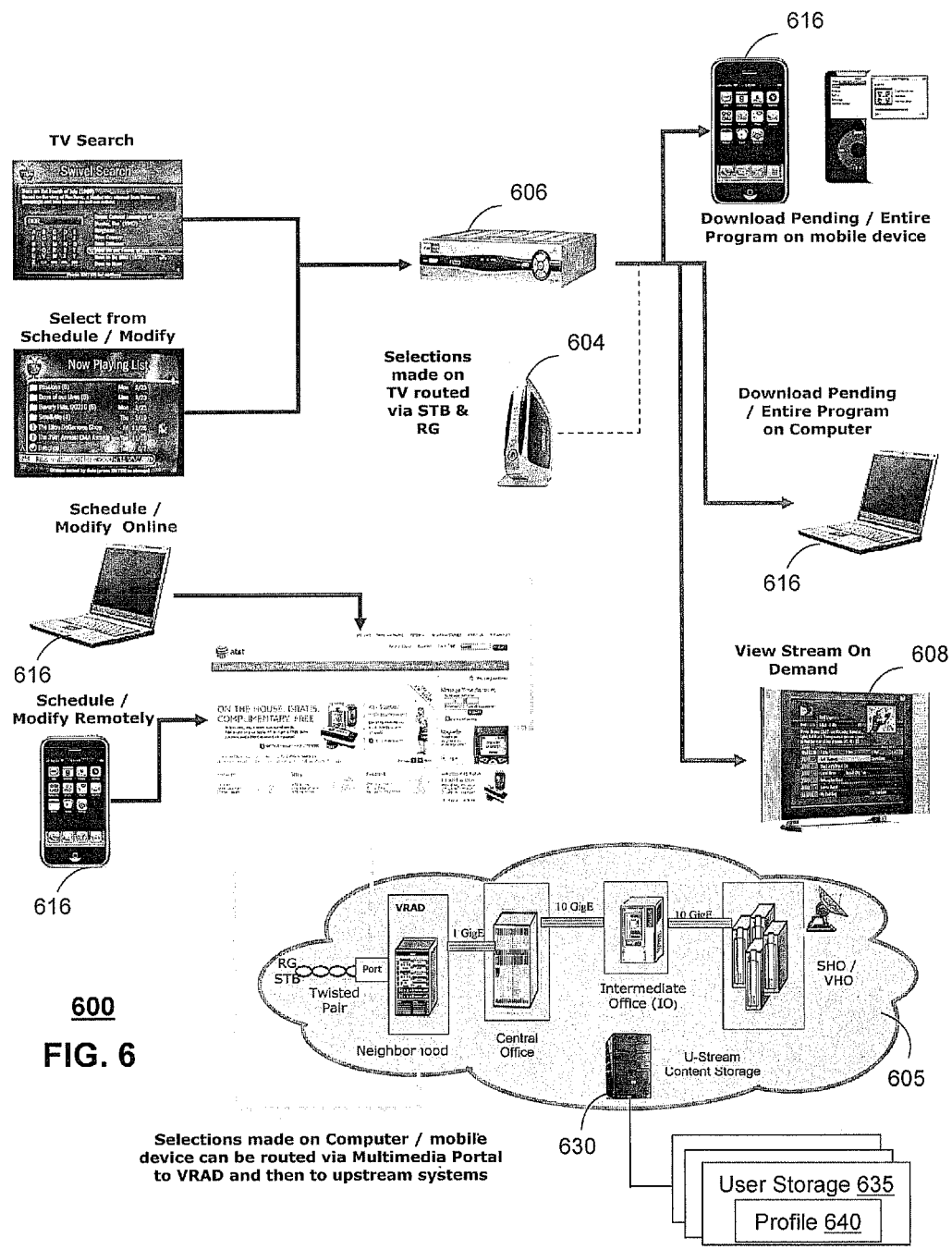
FIG. 6 depicts an illustrative embodiment of a communication system that provides media services.
Figure 6A:
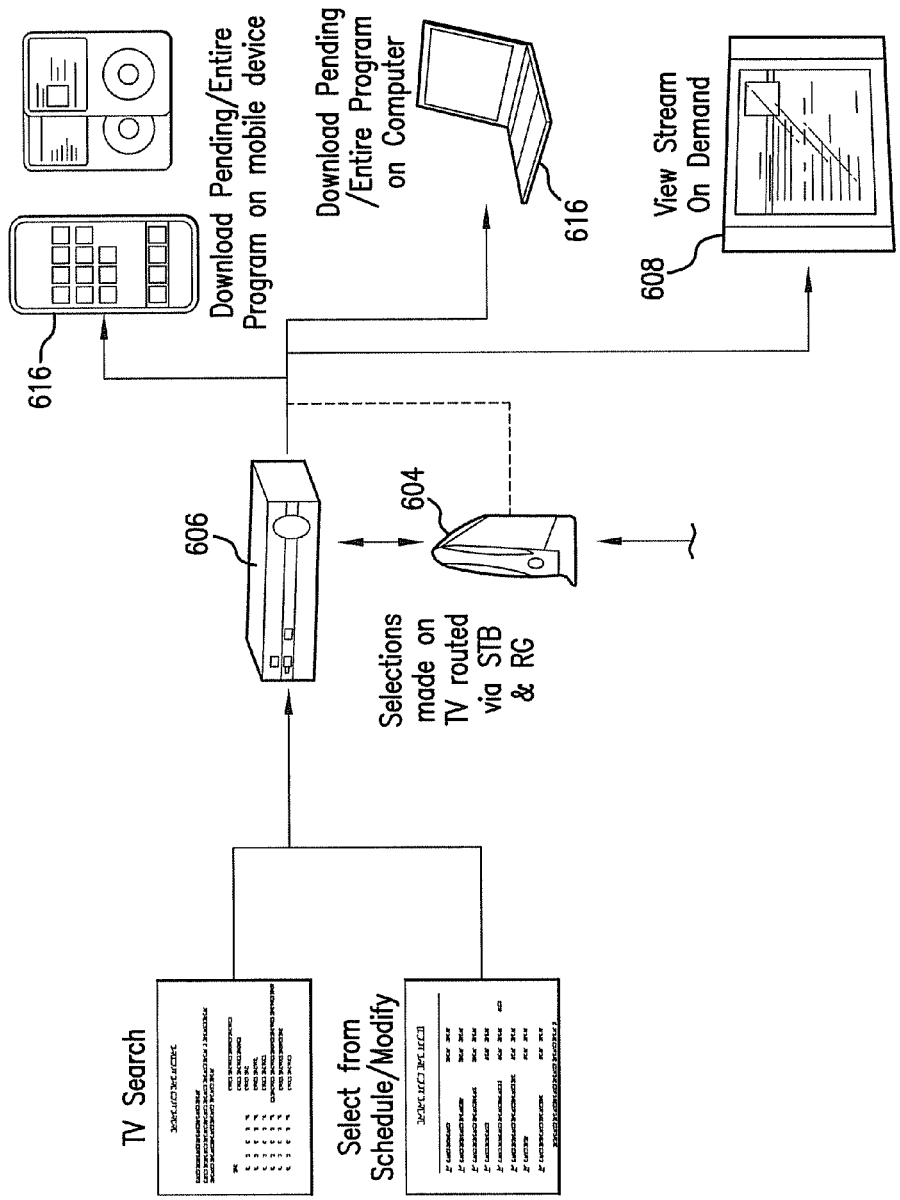
Figure 6B:
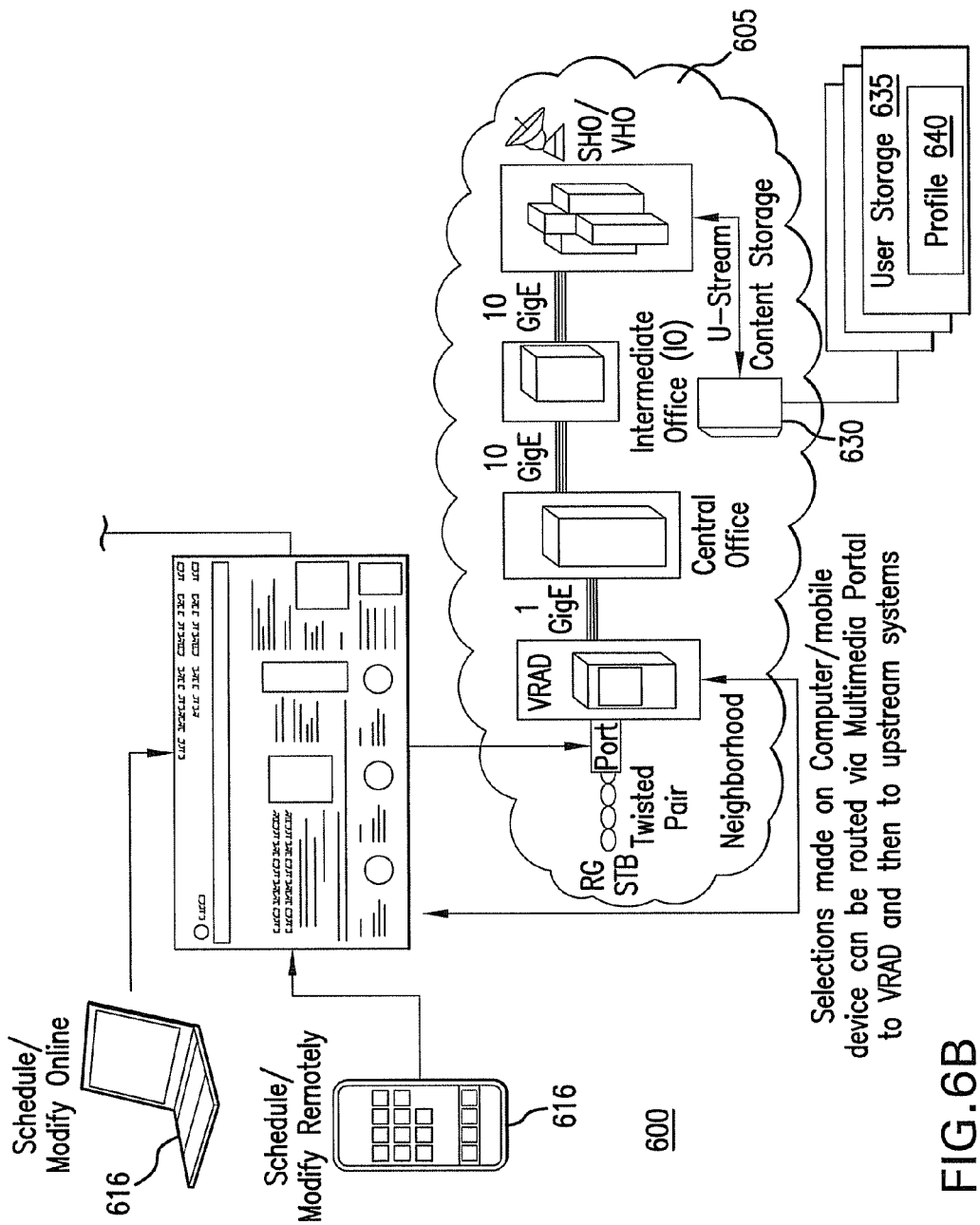

FIG. 6 depicts an exemplary embodiment of a communication system 600 for delivering media content. Communication system 600 can be overlaid or operably coupled with communication systems 100-300 as another representative embodiment of said communication systems.

System 600 can include a network 605 for delivery of the media content between the provider equipment, such as the VHO, and the customer's equipment, such as a residential gateway 604 having an STB 606 with a display device 608, and other communication devices 616, including computer desktops, laptop computers, PDA's, handheld devices, and so forth. The particular mode and/or protocol of communication for the STB 606, the gateway 604 and/or the devices 616 can vary, and can include wired and/or wireless modes and/or protocols. A number of network devices, including DSLAM's, service routers and Ethernet switches, can be utilized for transporting the signals along and from the network 605, and can be provided in various areas of the provider network including intermediate offices, central offices and neighborhood offices. The network 605 can utilize a number of connection structures for providing a communication link between the network devices and the STB 606, gateway 604, and/or devices 616, including twisted pair lines, fiber lines and/or wireless connections.

System 600 can include a server 630 having a memory or access thereto, such as a database, which can be used for establishing and maintaining user storage 635. The user storage 635 can be associated with one or more users of the network 605, the STB 606 and/or the devices 616, including individual users and/or groups of users. The user storage 635 can store, or otherwise provide access to, user profiles 640, including device identification data, device and/or user preferences, format capabilities, service plans, presence information, and so forth. In one embodiment, the user storage 635 can include media content that has been recorded pursuant to instructions from the STB 606 and/or the devices 616. In another embodiment, the user profiles 640 can include monitored behavior and history of the user and/or user pre-selections, such as preferences inputted by the user in temporal proximity to a request to record or playback.

In another embodiment, the user profile 640 can be imported in whole or in part from other sources, such as from a third party network, including previous service providers. In one embodiment, the user storage 635 can be a group storage for multiple users, such as users associated with a residence or a business entity, which has a plurality of individual user profiles 640 associated with each of the users. While system 600 depicts the server 630 storing the user storage 635 in a centralized fashion, it should be understood by one of ordinary skill in the art that the present disclosure contemplates other configurations, including distributed configurations, being applied to system 600.

The server 630 can include a multimedia portal which allows users to log on and search for desired media content. Searching can be performed based on a number of criteria, including categories, keywords and so forth. In one embodiment, the searching can be performed in combination with user information stored in the user storage 635. For instance, prior search data can be displayed to assist the user in searches. Search results can be displayed in combination with other applicable information determined from the user information of the user storage 635. For example, any costs associated with accessing particular media content can be determined and displayed based on service plan data retrieved from the user storage 635.

The server 630 can allow a user to record multiple content at various scheduled times, including simultaneously. In one embodiment, the server 630 can adjust or adapt the format of the media content to a preferred format(s) deliverable to the receiving device(s), such as STB 606 and/or mobile device 616. The server 630 can apply various techniques to adjust the media content, including encoding and transcoding. In one embodiment, the server 630 can adjust the media content into several formats which are each compatible with a different device of the user so that the user can playback the recorded media content on any of his or her devices, including STB 606 and device 616.

In one embodiment, the server 630 can provide for signal processing to be applied to the media content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference. The E-VSB data can be received by the server 630 and/or generated by the server.

For example, media content formatted using E-VSB or other multi-profiling formats with main and lower profile versions can be retrieved by the server 630, such as through transmission over the STL path to the VHO. The server 630 can then provide the viewers of the devices 616 and/or the STB 606 with all or some of the video versions during playback of the recorded media content, including one or more of the lower profile versions of the media content which have a lower resolution but higher error correction data (such as Forward Error Correction data) in order to maintain the link. In one embodiment, select one(s) of the profile versions can be provided when there is a fault or potential fault determined during the playback. The fault monitoring can be performed by the server 630 or some other monitoring device, and/or can be performed by the STB 606 and/or the devices 616. The fault or potential fault determination can be transmitted to the server 630 for adjusting the profile versions to be transmitted. The particular error correction technique utilized for the various profiles can vary and can include FEC, such as block coding, convolution coding, concatenate coding, turbo coding and so forth.

In one embodiment, the server 630 can utilize the user information in the user storage 635 to determine the fault or potential fault, and can also utilize this user information for determining which, if any, lower profile versions of the media content are to be provided to the mobile device 616 during playback of the recorded media content. The present disclosure contemplates transmitting a single profile version of the media content to the STB 606 and/or devices 616 that is selected from the plurality of profile versions in the E-VSB based on the user information. The present disclosure also contemplates multiple profile versions being received by the STB 606 and/or the devices 616.

The server 630 can string or otherwise compile the multiple recorded media content together for delivery to the user device that requests playback. In one embodiment, format adjustments can be performed prior to compiling the multiple media content for delivery and can be independent from each other. For example, a user can record several programs but only adjust the format of a portion of the programs or perform different adjustments to different programs. For instance, the user may desire to have a higher resolution for sporting events and a lower resolution for the post-game show, which have been recorded and compiled for delivery.

In one embodiment, the format adjustment can vary for a single media content. For instance, the server can provide a higher resolution for plays occurring during a recorded game but maintain a lower resolution for other events occurring during the game (such as player interviews and so forth). Various video analysis techniques can be applied to the media content to discern which portions are to be adjusted.

The exemplary embodiments can be performed by a single service provider or vendor, as well as through use of different service providers or vendors, including home and mobile services being different vendors where the service provider associated with the server 630 provides an agreed service coordination of benefit to the user. In one embodiment, the server 630 can be centered in the Internet, and the mobile and home service provider networks can contact the server through the Internet.

In one embodiment, the user can watch the same recorded media content on several different devices, including STB 606 and mobile device 616. For example, the recorded media content can be delivered to the STB 606 where the user commences viewing and then can be bookmarked so that delivery commencing from the bookmarked point can be performed for another of the user's devices, such as mobile communication device 616. The bookmarking can be performed by the server 630 and/or by the original receiving device, such as the STB 606.

In one embodiment, the device(s) 616 can be wirelessly in communication with the STB 606 through a first mode of communication, such as through a short-distance mode including WiMAX or WiFi. The device(s) 616 can then share (through transmission and/or receiving) the media content with the STB 606 directly without using the server 630. The device(s) 616 can be single-mode or multi-mode communication devices.

Figure 7:
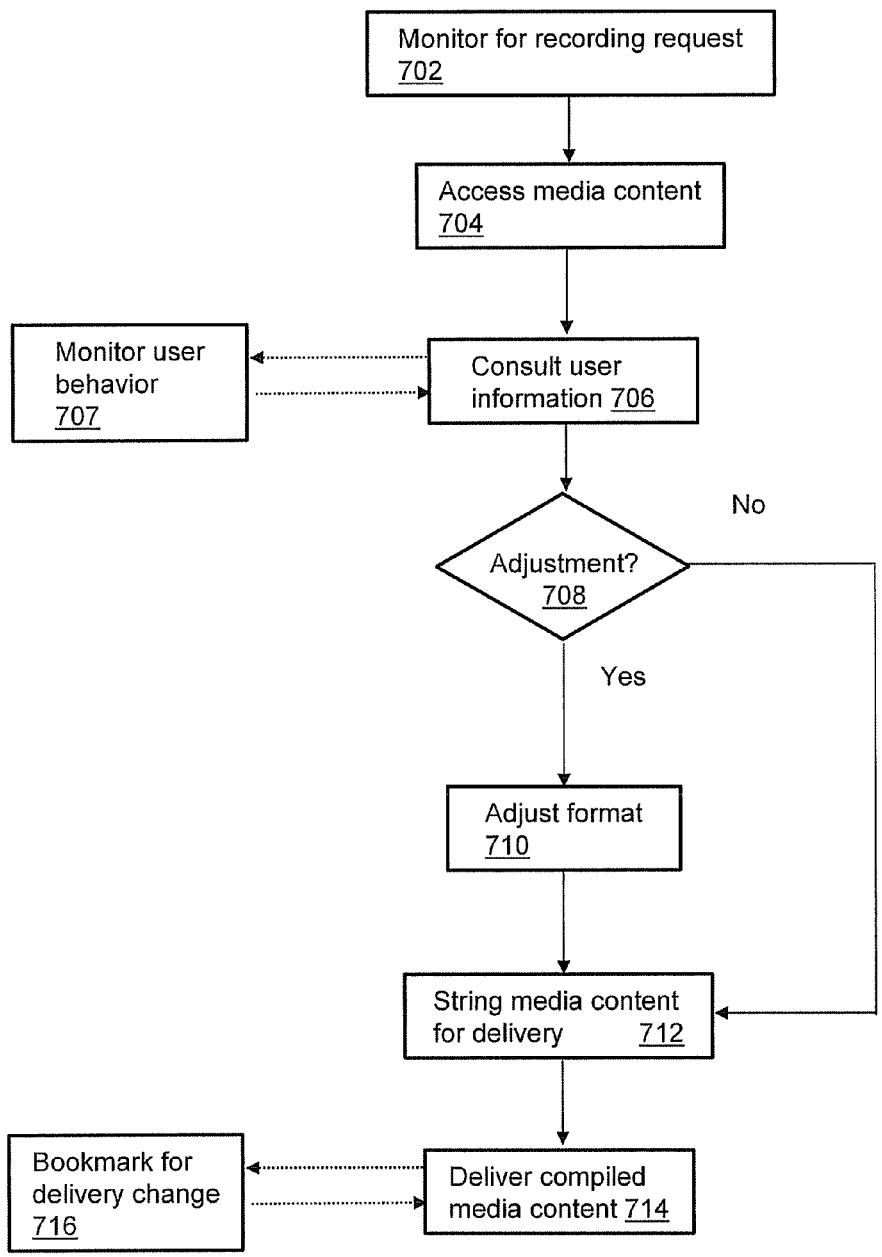
FIG. 7 depicts an illustrative embodiment of a method operating in portions of the communication systems of FIGS. 1-3 and 6.

FIG. 7 depicts an illustrative method 700 operating in portions of communication systems 100-300 and 600, including using server 630 of system 600. Method 700 can begin with step 702 in which the server 630 can monitor for a request for recording of media content by a communication device such as STB 606 or mobile device 616. The particular monitoring technique can vary and can include the mobile device transmitting the recording request directly to the server 630. The media content to be recorded can be regularly scheduled programming, VoD, and so forth. The recording request can be for immediate recording or a future recording.

The recording request can be a search request from the user device. For example, server 630 can provide for keyword and/or genre searches. Various Graphical User Interfaces (GUIs) can be provided to the user to facilitate the search. For instance, past searches and other user information can be retrieved from the user storage 635 and presented to the user. The user storage 635 can compile monitored behavior data associated with the user and one or more of the user's communication devices, such as the STB 606 and the mobile device 616. The behavior data can be utilized in facilitating searches for the user, including providing suggested search terms and so forth.

In step 704, the server 630 can access the media content that is to be recorded. In step 706, the server 630 can consult the user information of user storage 635 to determine if the media content to be recorded is in a desired format or is otherwise comprised of desired parameters associated with the user's communication devices, including the STB 606 and/or the mobile device 616. For instance, the media content can be adjusted to a preferred format through transcoding by the server 630. The preferred format as indicated by the user information can be from a user profile, monitored behavior of the mobile device or other communication devices associated with the user (such as in step 707), and/or inputted preferences, such as preferences provided by the user at the time of generating the recording request. In one embodiment, scheduled recordings can be made available to the user immediately.

In step 708 if adjustment of the media content is not desired then the server 630 can string or compile the multiple media content together as in step 712 so that it can be delivered in step 714 to a user communication device that requests playback, which can be the same device that requested the recording or a different device. If on the other hand, the media content is to be adjusted then the server 630, based on the user information, can perform transcoding, encoding or other format adjustment techniques to the media content in step 710 and then compile the multiple media content together.

In one embodiment, the format adjustment can be based on the use of multiple profile versions of the media content. For example, the server 630 can receive the data stream containing the main and secondary profiles, remove select profile versions, and transmit those select profile versions during playback by the communication devices, such as a handheld device 616. The profile versions can be re-multiplexed by the server 630 and stored in the user storage 635 awaiting the request for playback. In another embodiment, the media content can be adjusted into the main and secondary profiles by the server 630 from a single version retrieved by the server. The amount of error correction and thus the resolution of the profile versions can be determined based on the user information and preferences included therein.

In one embodiment in step 716, the delivery of the compiled media content can be paused and re-commenced to a different communication device using a bookmark as in step 716. For instance, a user can request playback of recorded, compiled media content on a dedicated channel of the STB 606 and then can resume watching a remainder of the content on a mobile device 616 through use of a bookmark placed in the content, such as by the server 630 and/or the STB 606.

Upon reviewing the aforementioned embodiments, it would be evident to an artisan with ordinary skill in the art that said embodiments can be modified, reduced, or enhanced without departing from the scope and spirit of the claims described below. For example, the server 630 can play a more active role in recording of media content, such as providing user prompts to indicate media content that can be recorded. The user prompts can be based on data in the user storage 635, including monitored recording and/or viewing behavior associated with the user and/or the user's communication devices.

In one embodiment, the user prompts can be generated in combination with presence information from the user storage 635. For example, the server 630 can transmit a user prompt to be displayed on a particular mobile device 616 when presence information indicates that the user is operating the mobile device and user information indicates that the user may desire to record an upcoming program or other media content.

Server 630 also provides for dynamic application of adjustments to the content format. For instance, an increase in resolution for the mobile device 616 may not be practical during a period of heavy traffic or weak signal strength. The server 630 can determine the practicality of such an adjustment and then implement the adjustment if practical. In one embodiment, the proposed adjustment can be communicated to the user so that they can determine if it is practical in a given set of circumstances. The server 630 can selectively provide for the coordination of adjustments based on a number of factors, including preferences in the user storage 635, information provided directly by the user, and/or other data, including parameters associated with the delivery of content that may effect the content.

Other suitable modifications can be applied to the present disclosure without departing from the scope of the claims below. Accordingly, the reader is directed to the claims section for a fuller understanding of the breadth and scope of the present disclosure.

Figure 8:
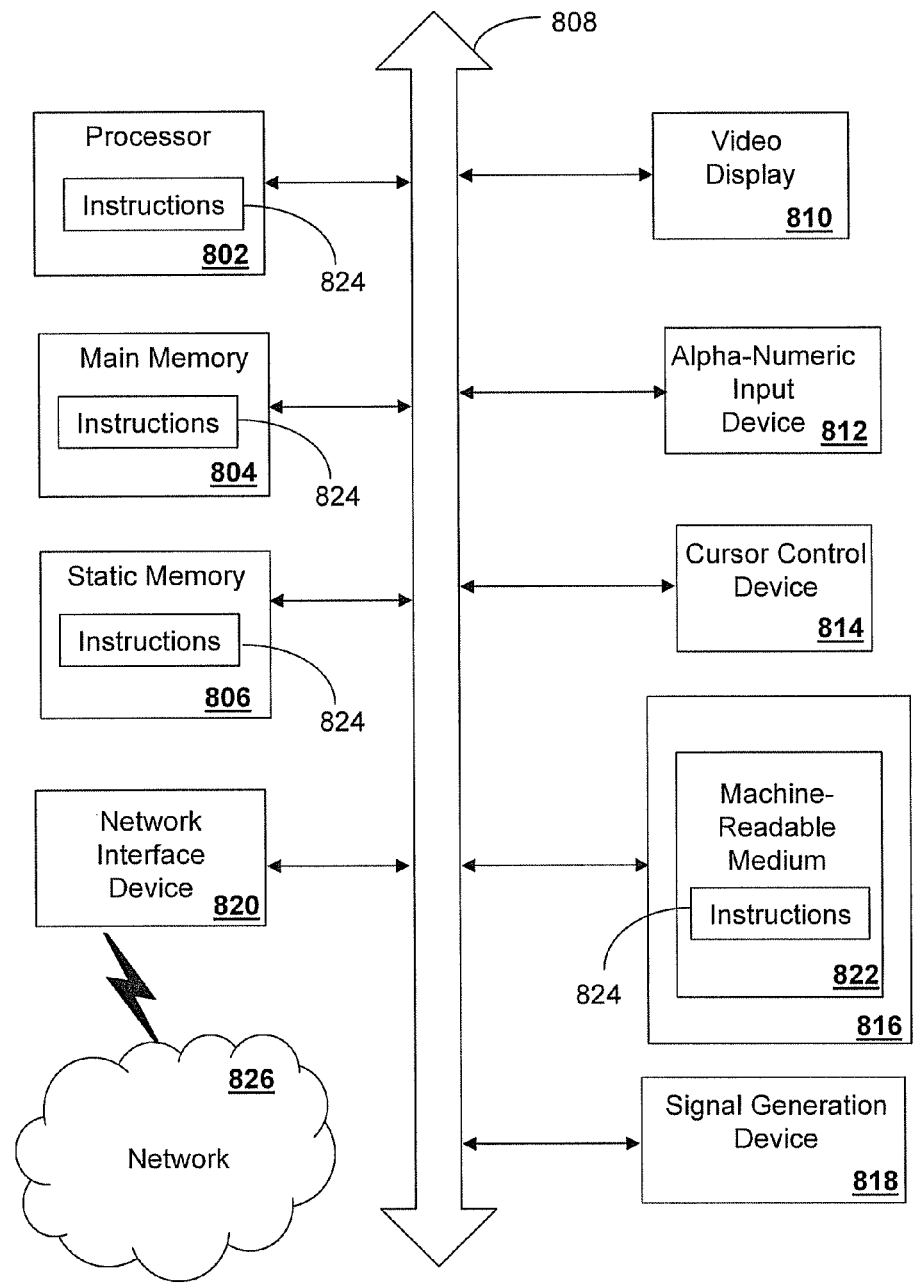
FIG. 8 is a diagrammatic representation of a machine in the form of a computer system within which a set of instructions, when executed, may cause the machine to perform any one or more of the methodologies discussed herein.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (such as a central processing unit (CPU)), a graphics processing unit (GPU, or both), a main memory 804 and a static memory 806, which communicate with each other via a bus 808. The computer system 800 may further include a video display unit 810 (such as a liquid crystal display (LCD)), a flat panel, a solid state display, or a cathode ray tube (CRT)).

The computer system 800 may include an input device 812 (such as a keyboard), a cursor control device 814 (such as a mouse), a disk drive unit 816, a signal generation device 818 (such as a speaker or remote control) and a network interface device 820.

The disk drive unit 816 may include a computer-readable medium 822 on which is stored one or more sets of instructions (such as software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising
    computer instructions which when executed by a processor causes the processor to perform operations comprising:
        receiving from a first communication device a request for recording multiple media content;
        obtaining multiple versions of each of the multiple media content, wherein a group of first versions of the multiple versions of the multiple media content has a lower resolution and more error correction data than a group of second versions of the multiple versions of the multiple media content;
        accessing a user profile associated with the first communication device;
        adjusting a format of a portion of the multiple media content to generate adjusted multiple media content based in part on the user profile;

concatenating the adjusted multiple media content that includes the group of second versions to generate second concatenated media content for delivery;

transmitting the second concatenated media content to the first communication device;

monitoring for a fault in delivery of the second concatenated media content to the first communication device;

responsive to a detection of the fault, concatenating the adjusted multiple media content that includes the group of first versions to generate first concatenated media content for delivery; and responsive to the detection of the fault ceasing the transmitting of the second concatenated media content and commencing transmitting, of the first concatenated media content to the first communication device.

2. The non-transitory storage medium of claim 1, comprising computer instructions for receiving fault information from the first communication device wherein the detection of the fault is based on fault information.

3. The non-transitory storage medium of claim 1, comprising computer instructions for transmitting one of the first or second concatenated media content to a second communication device associated with the user profile, wherein the adjusting of the format is based on a format preference associated with a second communication device.

4. The non-transitory storage medium of claim 1, comprising computer instructions for:

monitoring behavior associated with the first communication device and storing information associated with the monitored behavior in the user profile: and receiving fault information from a network element that monitors delivery, of the second concatenated -media content, wherein the detection of the fault is based on the fault information.

5. The non-transitory storage medium of claim 1, comprising computer instructions for transmitting search information to the first communication device based in part on prior recordings stored in the user profile.

6. The non-transitory storage medium of claim 1, wherein the group of first versions has more forward error correction data than the group of second versions, wherein an amount of the forward error correction data used in the first version is selected based on the user profile.

7. The non-transitory storage medium of claim 6, wherein the forward error correction data comprises one of block coding data, convolution coding data, concatenate coding data or turbo coding data.

8. A server, comprising:

a memory storing computer instructions; and a controller coupled with the memory, wherein the controller when executing the computer instructions performs operations comprising:

obtaining multiple media content in response to a request to record the multiple media content from a first communication device, wherein the multiple media content comprises a group of first versions having lower resolution and more error correction data than a group of second versions;

adjusting a format of a portion of the multiple media content to generate adjusted multiple media content based in part on a user profile associated with the first communication device;

compiling the adjusted multiple media content including the group of second versions to generate second compiled media content for delivery;

monitoring for a fault in delivery, of the second compiled media content to the first communication device; and responsive to a detection of the fault, compiling the adjusted multiple media content that includes the group of first versions to generate first compiled media content for delivery to the first communication device.

9. The server of claim 8, wherein the controller when executing the computer instructions performs operations comprising:

wirelessly transmitting the second compiled media content including the group of second versions to one of the first communication device or a second communication device in response to a request for playback received from one of the first communication device or the second communication device in an absence of a potential fault determination; and wirelessly transmitting the first compiled media content including the group of first versions to one of the first communication device or the second communication device in response to the detection of the fault.

10. The server of claim 9, wherein the second communication device comprises a set top box, and wherein the adjusting of the format is based on compatible formats for a group of communication devices comprising the first and second communication devices.

11. The server of claim 8, wherein the controller is adapted to adjust the format into a plurality of formats that are each associated with a user preference from the user profile, and wherein the first and second compiled media content are a plurality of compiled media content for each of the plurality of formats.

12. The server of claim 8, wherein the controller is adapted to monitor recording behavior of a plurality of communication devices associated with the user profile.

13. The server of claim 12, wherein the controller is adapted to transmit search information associated with the request to record to the first communication device, and wherein the search information is determined based in part on the monitored recording behavior.

14. The server of claim 8, wherein the controller is adapted to:

commence delivery of one of the first or second compiled media content to the first communication device;

bookmark the one of the first or second compiled media content at a pause point when viewing is paused; and commence delivery of the one of the first or second compiled media content to a second communication device from the pause point.

15. The server of claim 8, wherein the controller is adapted to adjust the format of the multiple media content for delivery to a dedicated channel of the first communication device.

16. A set top box comprising:

a memory storing computer instructions; and a controller coupled to the memory, wherein the controller when executing the computer instructions performs operations comprising:

transmitting to a server a request for recording multiple media content; transmitting to the server a playback request associated with the multiple media content;

receiving a second compilation of the multiple media content, wherein the compilation of the multiple media content comprises a second versions of the multiple media content, wherein the first version of the multiple media content has lower resolution and more error correction data than the second version of the multiple media content;

presenting the second version of the multiple media content on a display device;
monitoring for a fault in receiving the second compilation of the multiple media content;
responsive to a detection of the fault, transmitting fault information to the server; and
responsive to the transmitting of the fault information, receiving a first compilation of the multiple media content, the first compilation of the multiple media content having a format adjusted based on the user profile associated with the set top box, wherein the first compilation of the multiple media content comprises the first version of the multiple media content.

17. The set top box of claim 16, wherein the operations further comprise:
transmitting to the server a request for searching media content;
receiving search information from the server, the search information being based in part on the user profile associated with the set top box; and
present a selection of the media content based in part on the search information.

18. The set top box of claim 16, wherein the operations further comprise transmitting the second version of the multiple media content to a set top box in an absence of a potential fault determination.

19. The set top box of claim 18, wherein the operations further comprise,
responsive to the detection of the fault, transmitting the first version of the multiple media content to the set top box and ceasing transmitting of the second version to the set top box.

20. A mobile communication device, comprising:
a memory storing computer instructions; and
a controller coupled with the memory, wherein the controller when executing the computer instructions performs operations comprising:
transmitting to a server a request for recording media content; and transmitting to the server a playback request associated with the media content, the playback request being for presentation of the media content on a display device of a set top box, the media content having a format adjusted by the server based on a user profile associated with the mobile communication device and the set top box, wherein the media content comprises first and second versions of the media content, wherein the first version has lower resolution and more error correction data than the second version;
monitoring for a fault in receiving the second compilation of the multiple media content;
responsive to a detection of the fault, transmitting fault information to the server; and
responsive to the transmitting of the fault information, receiving a first compilation of the multiple media content, the received first compilation of the multiple media content having a format adjusted based on the user profile associated with the set top box, wherein the first compilation of the multiple media content comprises the first version of the multiple media content.

21. A method, comprising:
obtaining, by the system including a processor, first and second versions of multiple media content in response to a request to record the multiple media content from a first communication device associated with a user, wherein the first version has lower resolution and more error correction data than the second version;
adjusting, by the system, a format of a portion of the multiple media content to generate an adjusted multiple media content based in part on user preferences associated with the first communication device and a second communication device associated with the user; and
compiling by the system, the adjusted multiple media content including the second version to generate second compiled media content for delivery;
monitoring for a fault in delivery of the second compiled media content: and
responsive to the detection of the fault, compiling, by the system, the adjusted multiple media content including the first version to generate first compiled media content for delivery to the first communication device.

22. The method of claim 21, further comprising:
monitoring behavior associated with one of the first or second communication devices; and
determining the user preferences based in part on the monitored behavior.

23. The method of claim 22, further comprising transmitting search information to the first communication device, wherein the search information is determined based in part on the monitored behavior.

24. The method of claim 21, further comprising receiving a notice of a potential fault determination from one of the first or second communication devices, wherein the detection of the fault is based on the notice.

25. The method of claim 21, further comprising delivering the first compiled media content to the first communication and bookmarking the first compiled media content for delivery to the second communication device.

* * * * *